United States Patent [19]
Blackadder

[11] Patent Number: 6,129,385
[45] Date of Patent: Oct. 10, 2000

[54] SAFETY RESTRAINT

[75] Inventor: David Blackadder, Corby Hill Nr. Carlisle, United Kingdom

[73] Assignee: Breed Automotive Technology, Inc., Lakeland, Fla.

[21] Appl. No.: 09/200,621

[22] Filed: Nov. 30, 1998

[30] Foreign Application Priority Data

Jan. 2, 1998 [GB] United Kingdom .................. 9800048

[51] Int. Cl.[7] ................................................. B60R 22/28
[52] U.S. Cl. ......................... 280/805; 180/282; 188/318; 297/470
[58] Field of Search ........................ 280/805; 180/282; 297/470; 267/226; 188/313, 314, 318, 322.13; 137/48, 47, 51

[56] References Cited

U.S. PATENT DOCUMENTS

| | | | |
|---|---|---|---|
| 3,889,969 | 6/1975 | Otani | 280/805 |
| 3,947,058 | 3/1976 | Laporte | 297/470 |
| 4,019,685 | 4/1977 | Tangeman et al. | 137/47 |
| 4,152,025 | 5/1979 | Bendler et al. | 297/470 |
| 5,037,132 | 8/1991 | Borlinghaus et al. | 297/470 |
| 5,480,216 | 1/1996 | Matsunaga | 303/9.69 |

*Primary Examiner*—Lanna Mai
*Assistant Examiner*—Lynda Jasmin
*Attorney, Agent, or Firm*—Lonnie R. Drayer; Beth A. Vrioni

[57] ABSTRACT

A load limiting apparatus for a vehicle safety restraint belt is inserted in the force path between a mounting for a seat belt and a vehicle occupant. The load limiting apparatus has a vessel which contains fluid. The fluid is moved from one part of the vessel to another through a valve having a tapering profile to decrease the open area of a constriction as a function of the deceleration of the vehicle in a crash. Ideally the load limiting is self regulating and the force absorbed increases with increasing crash severity.

10 Claims, 2 Drawing Sheets

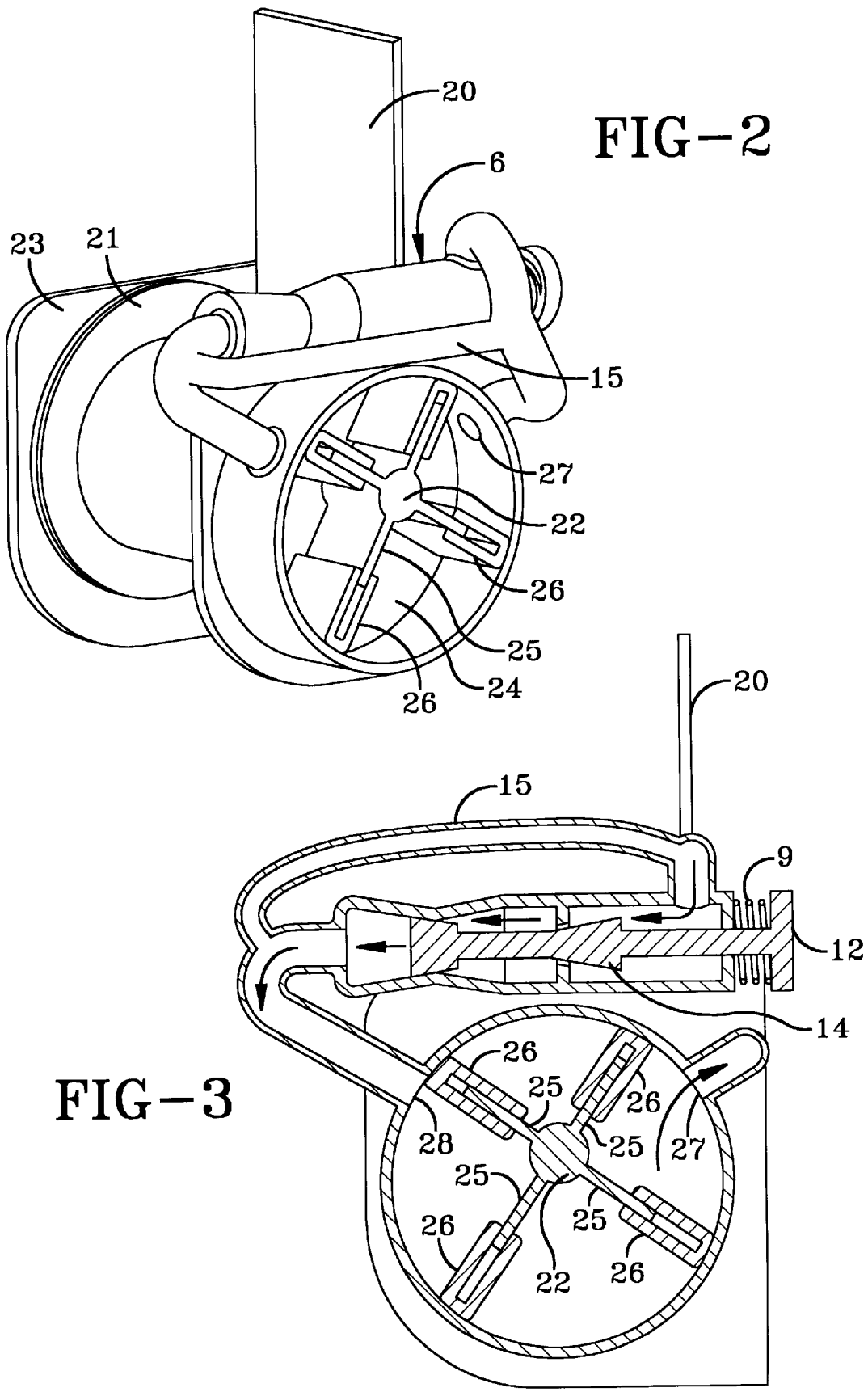

SAFETY RESTRAINT

FIELD OF THE INVENTION

The present invention relates to a vehicle safety restraint and particularly to load limiting arrangements for use in such restraints.

BACKGROUND OF THE INVENTION

Traditionally a vehicle safety restraint comprises seat belt webbing which passes around the torso and around the lap of a vehicle occupant to secure him in a vehicle seat. One end of the seat belt webbing is attached to a releasable buckle and the other end is wound onto the rotatable spool of a retractor. A modern retractor allows a vehicle occupant to move, for example to lean forward to reach radio controls or a glove compartment, provided the movement is relatively gentle. However in a crash when the occupant is subject to a sudden deceleration, a crash sensor causes the retractor to lock to prevent any further payout and to securely restrain the occupant.

In high velocity crashes the force exerted by the seat belt webbing on the vehicle occupant is extremely high and can itself cause injury. It has been proposed to introduce load limiting arrangements so as to controllably absorb some of this force felt by the occupant.

Load limiting arrangements can be introduced into any part of the webbing force path. For example a load limiter may be incorporated into the buckle mounting, or into the retractor itself, such as in the winding of the spool. The energy can be absorbed by bending pieces of metal, e.g. incorporating crush tubes or torsion bars into the system. Other known arrangements involve hydraulics, e.g. extrusion of fluids.

Some load limiting arrangements are described in co-pending GB applications 97 21 918.2 filed Oct. 14, 1997, 97 21 919.0 filed Oct. 14, 1997, 97 21 921.6 filed Oct. 14, 1997, 97 21 922.4 filed Oct. 14, 1997 and 97 21 924.0. filed Oct. 14, 1997.

A problem with the known systems which rely on bending metal or torsion bars is that the force absorbed is the same at low speeds, with small, light occupants, as at high speeds with large occupants. This constant force means that the large occupant, or the high speed crash, causes more payout of seat belt webbing than for low speeds, and in worst case situations the forward movement of the occupant, despite the belt restraint, can be so excessive as to result in an impact with an interior part of the vehicle causing injury.

Hydraulic systems have been suggested in which a feedback loop is provided so that a higher force can be absorbed with a higher speed of movement. Such systems are described in co-pending GB application 97 21 918.2 filed Oct. 14, 1997, particularly with respect to FIGS. 1 to 3. In these arrangements the absorbed force rises exponentially with the speed of movement of the occupant (generally the force is proportional to the speed to the power n, where n is between 1 and 2, depending upon the fluid properties and the design of the feedback valve). However this rapidly increasing force absorption is too severe and at very high speeds the force felt by the occupant is likely to be excessive.

Using different valve arrangements, for example profiling the valve pin, or changing the internal shape of the valve housing can provide a variety of force-speed relationships, for example a force absorbing curve which rises and then flattens with increasing speed, or a stepped arrangement, but the valve must be individually adapted to the expected crash pulse, and in practice only an average situation can be catered to.

SUMMARY OF THE INVENTION

It is an object of the present invention to provide an improved hydraulic force limiting arrangement for a safety restraint.

According to the present invention there is provided a load limiting arrangement for a vehicle safety restraint belt for insertion in the force path between a mounting for the belt and a vehicle occupant restrained by the belt, the arrangement comprising:

a vessel a fluid contained in the vessel a means for moving the fluid from one part of the vessel to another through a valve means adapted to change the open area in a constriction, the valve means having a tapering profile to decrease the open area of the constriction as a function of the deceleration of the vehicle in a crash.

Preferably the function is such that the area is decreased by a factor of the speed to the power n where n is between 1 and 2, so as to absorb a higher proportion of the load for higher speeds.

In one embodiment, the vessel is a cylinder and the fluid moving means is a piston which may be spring loaded. In another embodiment a rotary drive is used. A feedback pipe from one end of the cylinder to the other has one or more constrictions forming one or more valve seats for tapering spring loaded valves. Optionally a narrow bypass tube is arranged to allow the spring to re-set the mechanism and to allow fluid to flow during normal use but is sufficiently narrow to prevent a large volume of fluid flowing through it in a crash situation: in this case the fluid is forced through the feedback pipe and valve arrangement. Ideally the load limiting is self regulating and the force absorbed increases with increasing crash severity. The exact profile is developed for a particular vehicle and is carefully tailored so that the force absorbed depends upon the point of time during the crash pulse and the particular crash conditions.

BRIEF DESCRIPTION OF THE DRAWINGS

For a better understanding of the present invention and to show how the same may be carried into effect, reference will now be made to the accompanying drawings, in which:

FIG. 2 is a perspective view of a load limiter according to a second embodiment of the invention.

FIG. 3 is a cross-section of the load limiter of FIG. 2.

DETAILED DESCRIPTION OF THE INVENTION

Figure 1:
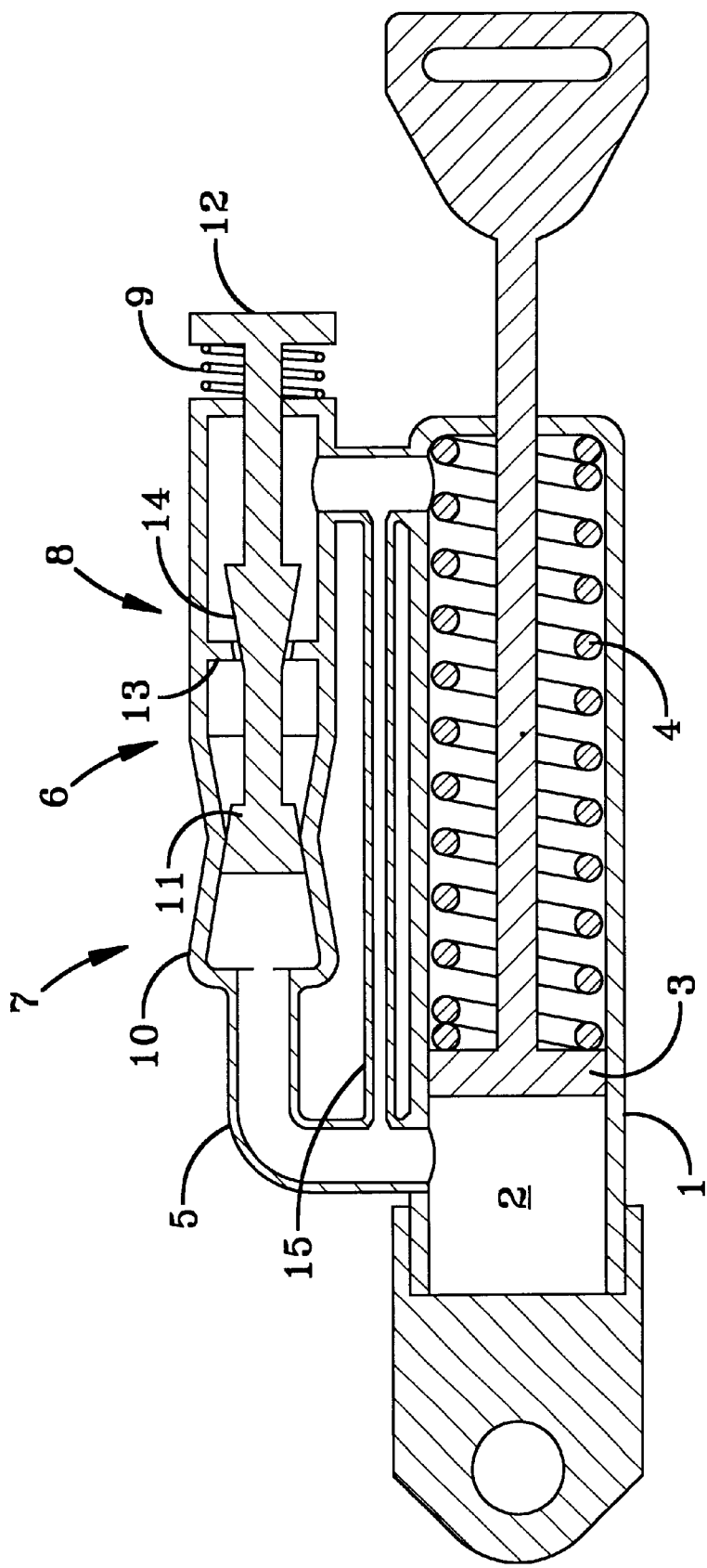
FIG. 1 is a cross-section of a load limiter according to a first embodiment of the invention.

The load limiter of FIG. 1 comprises a cylinder 1 containing a fluid 2. A piston 3 is loaded by a spring 4 inside the cylinder 1. A feedback pipe 5 connects the end of the cylinder at one side of the piston 3 to the other end of the cylinder 1 on the other side of piston 3. In the feedback path is an assembly 6 including a flow meter part 7 and a valve part 8. The flow meter 7 comprises a flow meter member 11 mounted on a valve spindle 12. The flow meter member 11 moves the valve spindle 12 as the fluid flow moves through the assembly 6. The shape of the flow meter housing 10 thus controls the reaction of the valve spindle 12 and therefore controls the flow rate, i.e. the force curve for the load limiter.

The valve 8 comprises a valve seat 13 and a valve pin 14, which is also mounted on the valve spindle 12. The shape of the valve pin controls the flow rate and thus the force curve. The valve spindle 12 is reset by a spring 9.

A narrow bypass tube 15 cross-circuits the assembly 6 and allows fluid to flow during normal use, but prevents large volumes of fluid flowing, other than via the assembly 6, in crash conditions.

In the embodiment of FIGS. 2 and 3 the assembly 6 and the bypass tube 15 are constructed in a similar manner and operate in the same way. Like reference numerals refer to like parts. However in this embodiment the assembly is attached to a rotary fluid driving arrangement inside of the linear piston-cylinder arrangement of FIG. 1. This is particularly suitable for attachment to a seat belt retractor as shown in FIG. 2. A seat belt 20 is wound on retractor spool 21 which is mounted in a frame 23 for rotation about a spindle 22.

One end of spindle 22 extends into a circular chamber 24 filled with fluid. The end of spindle 22 is integrally formed with radially extending paddles 25 so that, as the spindle 22 rotates, the fluid in the chamber 24 is moved around. The spindle 22 is offset relative to the geometric center of the chamber 24 and the paddles 25 have telescopic seals 26 attached to their ends biased to the radially outward positions. Two openings 27, 28 are formed in the side of the chamber to connect to the assembly 6. Rotation of the spindle 22, for example when the seat belt webbing is under tension as in a crash, rotates the paddles and forces fluid into assembly 6 and through the load limiting valve arrangement, thus absorbing some of the force of the crash. In normal use the fluid flows through the bypass pipe 15 without any substantial absorption of energy. The bypass pipe 15 thus allows the load limiting assembly 6 to be connected to the seat belt arrangement permanently, without the need for complex and expensive clutches or similar to connect and disconnect the load limiting depending on whether there is a crash.

The invention may be embodied in other specific forms without departing from the spirit or essential characteristics. The described embodiments are to be considered in all respects only illustrative and not restrictive. The scope of the invention is therefore indicated by the appended claims rather than by the foregoing description. All changes which come within the meaning and range of equivalency of the claims are to be embraced within their scope.

What is claimed is:

1. A load limiting apparatus for a vehicle safety restraint belt for insertion in the force path between a mounting for the belt and a vehicle occupant restrained by the belt during deceleration of a vehicle, the arrangement comprising:
   (a) a vessel
   (b) a fluid contained in the vessel; and
   (c) means for moving the fluid from one part of the vessel to another through a valve means adapted to change an open area in a constriction, the valve means having a tapering profile to decrease the open area of the constriction as a function of the deceleration of the vehicle in a crash.

2. The load limiting apparatus of claim 1 wherein the vessel is a cylinder and the fluid moving means is a piston.

3. The load limiting apparatus of claim 2 wherein the piston is spring loaded.

4. A load limiting apparatus for a vehicle safety restraint belt for insertion in the force path between a mounting for the belt and a vehicle occupant restrained by the belt during deceleration of a vehicle, the arrangement comprising:
   (a) a vessel
   (b) a fluid contained in the vessel; and
   (c) means for moving the fluid from one part of the vessel to another through a valve means adapted to change an open area in a constriction, the valve means having a tapering profile to decrease the open area of the constriction as a function of the deceleration of the vehicle in a crash, wherein the vehicle is travelling at a speed and the area of the constriction is decreased by a factor of the speed to a power n where n is between 1 and 2, so as to absorb a higher proportion of the load for higher speeds.

5. The load limiting apparatus of claim 4 wherein the vessel is a cylinder and the fluid moving means is a piston.

6. The load limiting apparatus of claim 5 wherein the piston is spring loaded.

7. The load limiting apparatus of claim 4 wherein the valve means comprises a feedback pipe having at least one constriction forming at least one valve seat for a tapering spring loaded valve.

8. The load limiting apparatus of claim 7 further comprising a narrow bypass tube arranged to allow a spring to re-set a mechanism and to allow fluid to flow during normal use but is sufficiently narrow to prevent a large volume of fluid flowing therethrough in a crash situation.

9. A load limiting apparatus for a vehicle safety restraint belt for insertion in the force path between a mounting for the belt and a vehicle occupant restrained by the belt during deceleration of a vehicle, the arrangement comprising:
   (a) a vessel
   (b) a fluid contained in the vessel; and
   (c) means for moving the fluid from one part of the vessel to another through a valve means adapted to change an open area in a constriction, the valve means having a tapering profile to decrease the open area of the constriction as a function of the deceleration of the vehicle in a crash, wherein the valve means comprises a feedback pipe having at least one constriction forming at least one valve seat for a tapering spring loaded valve.

10. The load limiting apparatus of claim 9 further comprising a narrow bypass tube arranged to allow a spring to re-set a mechanism and to allow fluid to flow during normal use but is sufficiently narrow to prevent a large volume of fluid flowing therethrough in a crash situation.

\* \* \* \* \*